(12) United States Patent
Wilenski et al.

(10) Patent No.: US 9,682,536 B2
(45) Date of Patent: Jun. 20, 2017

(54) SANDWICHED FIBER COMPOSITES FOR BALLISTIC APPLICATIONS

(75) Inventors: Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 12/969,532

(22) Filed: Dec. 15, 2010

(65) Prior Publication Data

US 2012/0152099 A1 Jun. 21, 2012

(51) Int. Cl.
 *F41H 5/04* (2006.01)
 *B32B 7/02* (2006.01)
 *B32B 17/10* (2006.01)
 *B32B 17/06* (2006.01)

(52) U.S. Cl.
 CPC ............ *B32B 17/10* (2013.01); *B32B 17/067* (2013.01); *F41H 5/0407* (2013.01); *F41H 5/0435* (2013.01); *Y10T 156/10* (2015.01); *Y10T 428/24983* (2015.01)

(58) Field of Classification Search
 CPC ..... B64C 1/1492; B64C 1/1484; B32B 17/00; B32B 17/06; B32B 2307/412; B32B 9/04; B32B 2571/02; B32B 27/06; F41H 5/0407; F41H 5/0435; F41H 5/047; B29K 2995/0026; Y10T 428/252; Y10T 428/31525; Y10T 428/24942; Y10S 428/911; B29L 2009/00; B29L 2031/778
 USPC ....... 89/905, 914, 906, 908, 917; 2/2.5, 412; 428/911, 325; 296/190.1, 84.1; 52/204, 52/593; 156/99
 See application file for complete search history.

(56) References Cited

U.S. PATENT DOCUMENTS

| 4,461,855 | A | 7/1984 | Phillips |
| 4,732,803 | A | 3/1988 | Smith |
| 5,060,553 | A | 10/1991 | Jones |
| 5,665,450 | A | 9/1997 | Day et al. |
| 6,332,390 | B1 | 12/2001 | Lyons |
| 6,889,938 | B1* | 5/2005 | Nordman .................. 244/129.3 |
| 8,087,340 | B2* | 1/2012 | Hansen et al. ............... 89/36.02 |
| 8,245,975 | B2* | 8/2012 | Abel et al. ................. 244/129.3 |
| 2002/0106510 | A1* | 8/2002 | Deguchi et al. ............. 428/364 |
| 2004/0062934 | A1 | 4/2004 | Miller |
| 2005/0082432 | A1* | 4/2005 | Nordman .............. B29C 70/086 244/129.3 |
| 2008/0241537 | A1 | 10/2008 | Sennett |
| 2009/0181211 | A1 | 7/2009 | Lang |
| 2009/0297816 | A1* | 12/2009 | Arvidson et al. ............. 428/221 |

(Continued)

FOREIGN PATENT DOCUMENTS

| CA | 2672723 A1 | 7/2008 |
| CA | 2689294 A1 | 12/2008 |
| CN | 2847208 Y | 12/2006 |

(Continued)

OTHER PUBLICATIONS

International Search Report—PCT/US2011/060177—dated Feb. 14, 2012.

(Continued)

*Primary Examiner* — Camie Thompson (57) ABSTRACT

A structure may comprise a first outer layer and a polymer fiber composite layer mounted on one side of the first outer layer.

20 Claims, 6 Drawing Sheets

(56) References Cited

U.S. PATENT DOCUMENTS

2010/0263525 A1 10/2010 Siebers
2012/0006190 A1* 1/2012 Zachau et al. ............... 89/36.17

FOREIGN PATENT DOCUMENTS

| EP | WO2009149951 | * | 12/2009 |
| EP | 2145822 | | 1/2010 |
| GB | 2284655 | | 6/1995 |
| GB | 2364956 | | 2/2002 |
| GB | 2364956 A | | 2/2002 |
| JP | H03236599 | | 10/1991 |
| JP | 2004345906 A | | 12/2004 |
| JP | 2009-079861 | * | 4/2009 |
| JP | 2009079861 A | | 4/2009 |
| JP | 2009264692 | * | 11/2009 |

OTHER PUBLICATIONS

H. Lin, et al. "Temperature and wavelength dependent transmission of optically transparent glass fibre poly(methyl methacrylate) composites," Journal of Materials Science 29 (1994) 5193-5198.
Japanese Patent Office, Notice of Rejection, dated Feb. 2, 2016.
Australian Patent Office, Patent Application No. 2011341616; Australian Examination Report dated Aug. 7, 2015.
Chinese Intellectual Property Office, Patent Appln. No. 201180059991.5; Chinese Office Action dated Aug. 3, 2015.
European Patent Office, Office Action dated Sep. 23, 2016.
Canadian Patent Office, Office Action dated Nov. 28, 2016.
U.S. Appl. No. 12/901,342, "Transparent Composites With Organic Fiber" by Michael Kozar et al. and filed Oct. 8, 2010.
Canadian Patent Office, Office Action dated Mar. 18, 2016.

* cited by examiner

SANDWICHED FIBER COMPOSITES FOR BALLISTIC APPLICATIONS

FIELD

The present disclosure relates generally to composites and, more particularly, to the use of fiber reinforced composites for improving ballistic performance.

BACKGROUND

Transparent armor panels as currently known may be comprised of laminated sheets of various materials including an outer layer or strike face comprised of glass, ceramic or glass-ceramic. The outer layer or strike face may be configured to receive an impact from a projectile. In attempts to improve the ballistic performance of armor panels, manufacturers may add materials to the back side of the strike face. For example, in an attempt to increase the strength of the strike face, manufacturers may add a solid monolithic sheet or layer of material such as glass to the back side of the strike face to act as a backing for the strike face.

Unfortunately, adding a layer of monolithic material to the strike face may result in a relatively heavy armor panel due to the relatively high density of glass and ceramic material of the strike face and the relatively high density of the monolithic glass material added as a backing to the strike face. Furthermore, the addition of monolithic material to the strike face may provide relatively minor improvements in the ballistic performance of the armor panel.

Manufacturers may also add one or more layers of solid monolithic polycarbonate material to the back side of the ceramic strike face to improve the ballistic performance of the armor panel. Unfortunately, polycarbonate material provides minimal resistance to deformation of the strike face. In addition, adding a polycarbonate backing to the strike face may result in an armor panel that is relatively heavy due to the relatively large thickness of the ceramic strike face that may be required to provide effective ballistic performance of the armor panel.

As can be seen, there exists a need in the art for a structure such as an armor panel providing improved ballistic performance with minimal weight.

BRIEF SUMMARY

The above-described needs associated with armor panels are specifically addressed and alleviated by the present disclosure which provides a structure having a first outer layer and one or more polymer fiber composite layers. The first outer layer may function as a strike face and may be formed of ceramic and/or glass material. The one or more polymer fiber composite layers may be mounted on one side of the first outer layer and may have a stiffness that is less than the stiffness of the first outer layer.

Also disclosed is a transparent armor panel which may include a first outer layer comprised of ceramic and/or glass material and a sandwich stiffening structure mounted to the first outer layer. The stiffening structure may include an intermediate layer and a second outer layer separated by a polymer fiber composite layer. The intermediate layer may be mounted to the first outer layer. The polymer fiber composite layer may be mounted to the intermediate layer and may comprise a plurality of polymer fibers embedded within the matrix. The second outer layer may be mounted to the polymer fiber composite layer on a side thereof opposite the intermediate layer. The intermediate layer and the second outer layer may each have a thickness that is less than a thickness of the polymer fiber composite layer. In addition, the intermediate layer and the second outer layer may each have a higher stiffness than the polymer fiber composite layer. In an embodiment, the first outer layer, intermediate layer, polymer fiber composite layer and second outer layer may each be substantially optically transparent.

Also disclosed is a methodology of manufacturing a structure which may include the steps of forming a first outer layer from ceramic and/or glass material and forming a polymer fiber composite layer from a plurality of fibers embedded within a matrix. The polymer fiber composite layer may be provided with a stiffness that is less than the stiffness of the first outer layer. The methodology may include mounting the polymer fiber composite layer to the first outer layer.

In a further embodiment, disclosed is a methodology of manufacturing a transparent armor panel. The methodology may include forming a first outer layer from substantially optically transparent ceramic and/or glass material. The methodology may further include forming a substantially optically transparent stiffening structure which may be mounted to the first outer layer. The stiffening structure may be manufactured by forming a polymer fiber composite layer from a plurality of polymer fibers embedded within a matrix. An intermediate layer may be formed from glass layers or the intermediate layer may be formed as a high stiffness composite layer. The methodology may further include forming a second outer layer from one or more glass layers or forming the second outer layer as a high stiffness composite layer. The intermediate layer and the second outer layer may each have a stiffness that is greater than a stiffness of the polymer fiber composite layer. The methodology may include mounting the intermediate layer and the second outer layer on opposite sides of the polymer fiber composite layer to form a sandwich stiffening structure. The stiffening structure may be mounted to the first outer layer at the interface between the intermediate layer and the first outer layer.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
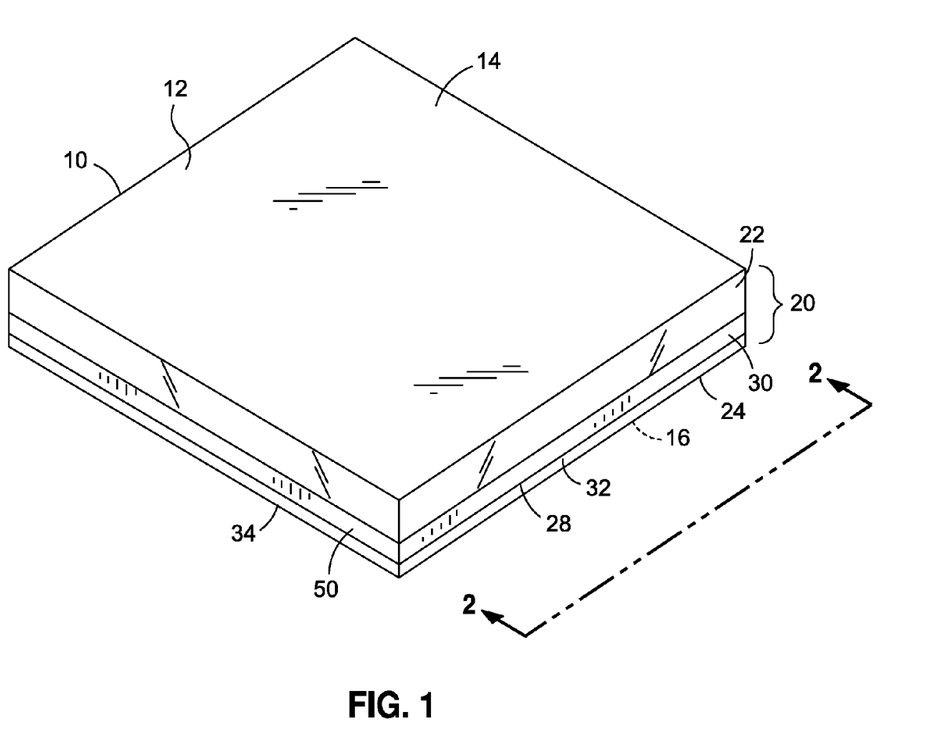
FIG. 1 is a perspective illustration of a substantially optically transparent structure or armor panel in an embodiment comprising a ceramic and/or glass first outer layer and a glass second outer layer and including a core located between the first and second outer layers wherein the core comprises a polymer fiber composite layer.

Referring now to the drawings wherein the showings are for purposes of illustrating preferred and various embodiments of the disclosure, shown in FIG. 1 is a structure 10 which may be configured as a substantially optically transparent armor panel 12. The structure 10 is illustrated as a panel having a generally planar configuration. However, the structure 10 may be provided in any number of a variety of different sizes, shapes and configurations and is not limited to a substantially planar panel having planar surfaces. For example, the composite article may include compound curvature surfaces and/or planar surfaces.

The structure 10 may include a first outer layer 22 which may be comprised of ceramic and/or glass material and which may comprise a strike face 14 of the structure 10. The first outer layer 22 may be backed by a polymer fiber composite layer 30 in the embodiment illustrated in FIG. 1. In this regard, the present disclosure contemplates organic fibers for use in any of the composite layers and wherein organic fibers can include polymer fibers. The structure 10 may further include a second outer layer 24 which may be mounted on a side of the polymer fiber composite layer 30 opposite the first outer layer 22 and which may comprise a back face 16 of the structure 10. However, the first outer layer 22 may be backed by alternative arrangements of layers between the first and second outer layers 22, 24.

Figure 8:
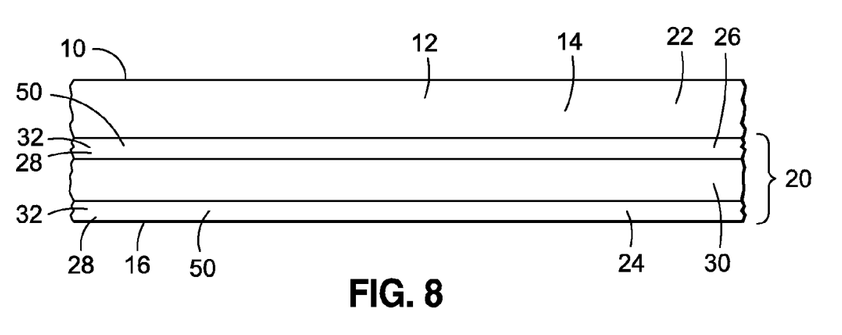
FIG. 8 is a schematic side view illustration of the structure in an embodiment illustrating the polymer fiber composite layer sandwiched between the second outer layer and an intermediate layer and forming a stiffening structure.

For example, the structure 10 may comprise the first outer layer 22 being backed by a stiffening structure 20 as shown in FIG. 8 wherein the stiffening structure 20 may comprise an intermediate layer 26 and a second outer layer 24 separated by a polymer fiber composite layer 30. Even further, the structure 10 may comprise the first outer layer 22 having alternating intermediate layers 26 and polymer fiber composite layers 30 mounted to the first outer layer 22 and wherein the second outer layer 24 may be mounted to the back face 16 of the structure 10 as discussed below.

Referring still to FIG. 1, the first outer layer 22 may be comprised of a material which is preferably of relatively high hardness. For example, the first outer layer 22 may be formed at least partially of ceramic and/or glass material which may be provided as a monolithic layer of ceramic and/or glass. In an embodiment, the first outer layer 22 may be formed of ceramic, glass or a combination of ceramic and glass such as ROBAX™ glass-ceramic material. However, the first outer layer 22 may be formed in a variety of alternative materials which are preferably stiff and which preferably have relatively high hardness. The first outer layer 22 may be configured to function as a strike face 14 for ballistic applications such that the first outer layer 22 is configured to be impacted by a projectile.

Figure 4:
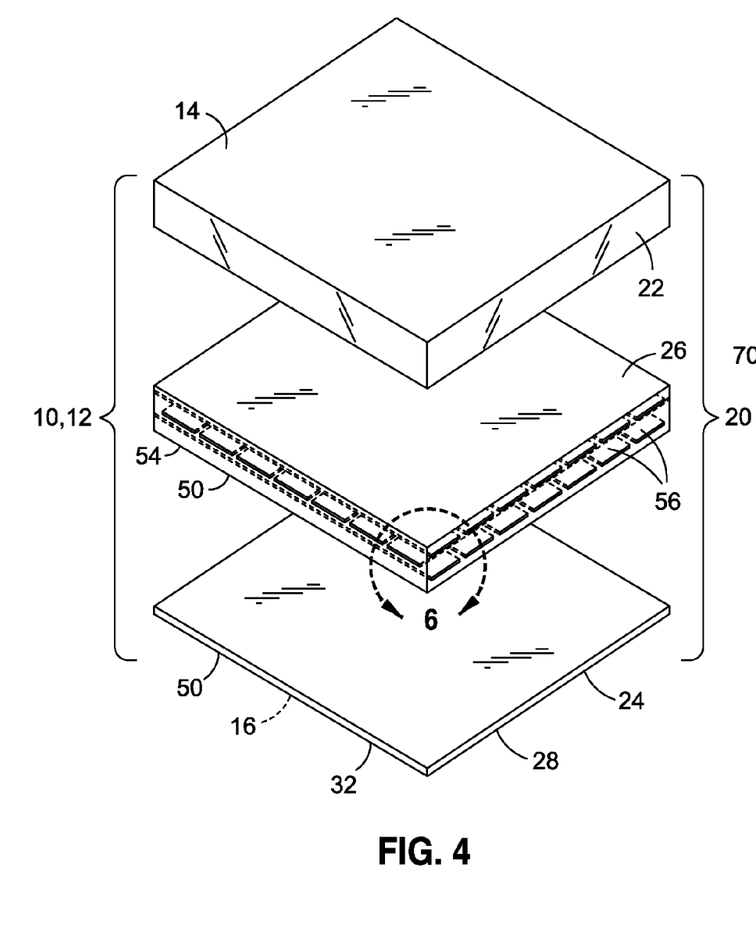
FIG. 4 is an exploded perspective illustration of the structure of FIG. 1 illustrating the polymer fiber composite layer disposed between the first and second outer layers.

Referring still to FIG. 1, the second outer layer 24 may be formed of a high stiffness composite layer 32 including a plurality of glass fibers 56 (FIG. 4) which may be embedded in a matrix 54 (FIG. 4). Alternatively, the second outer lay 24 may be comprised of one or more glass layers 28 or sheets. Each one of the glass layers 28 may be formed as a monolithic sheet of glass and may be mounted to the polymer fiber composite layer 30. The second outer layer 24 may also be formed as a high stiffness composite layer 32 comprised at least partially of glass fibers 56 formed of high strength and/or high stiffness polymeric material such as ultra high density polyethylene and which may be embedded within a matrix 54 as described in greater detail below.

In the embodiment illustrated in FIG. 1, the structure 10 may include a polymer fiber composite layer 30 which may be sandwiched between the second outer layer 24 and the first outer layer 22. The polymer fiber composite layer 30 may be formed of a plurality of polymer fibers 56 (FIG. 4) which may be at least partially embedded in a matrix 54 (FIG. 4). The second outer layer 24 may have a higher stiffness than the polymer fiber composite layer 30. Likewise, the first outer layer 22 may have a higher stiffness than the polymer fiber composite layer 30.

Referring still to FIG. 1, in an embodiment, the combination of the first outer layer 22, polymer fiber composite layer 30, and second outer layer 24 collectively form the stiffening structure 20 which increases the global stiffness of the first outer layer 22 and improves the ballistic performance of the structure 10. The polymer fiber composite layer 30 functions as a core material for the sandwich stiffening structure 20. More specifically, the polymer fiber composite layer 30 core acts as a spacer to space apart the face sheets of the sandwich stiffening structure 20 wherein the face sheets comprise the first outer layer 22 and the second outer layer 24.

Figure 2:
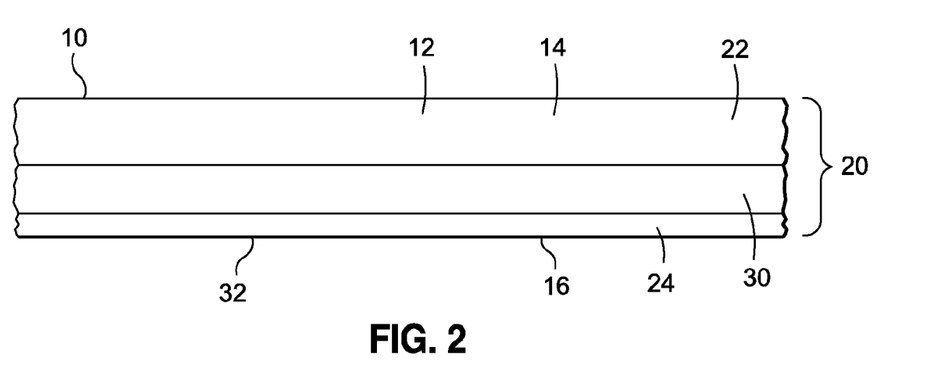
FIG. 2 is a schematic side view illustration of the structure of FIG. 1 taken along line 2 of FIG. 1 and illustrating an embodiment of the structure having the polymer fiber composite layer disposed between the first and second outer layers and wherein the second outer layer comprises a high stiffness composite layer.
Figure 3:
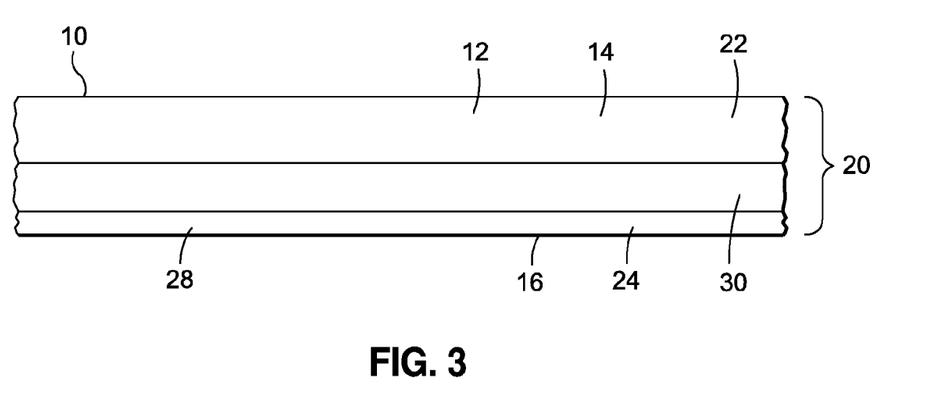
FIG. 3 is a schematic side view illustration of the structure of FIG. 1 in an embodiment wherein the second outer layer comprises one or more monolithic glass layers.

The polymer fibers 56 (FIG. 4) of the polymer fiber composite layer 30 are configured to undergo high deformation or high strains prior to failure of the polymer fibers 56 such that a projectile may be decelerated over a relatively longer time period and along a relatively longer distance of travel through the polymer fiber composite layer 30 (FIGS. 2-3). The net effect of the increased time period or duration of deformation of the polymer fiber composite layer 30 is an increase in the amount of projectile kinetic energy that may be absorbed by the fibers 56 of the polymer fiber composite layer 30 allowing the projectile to be decelerated and arrested prior to penetration through the structure 10.

Referring still to FIG. 1, the first outer layer 22 inherently has a relatively higher stiffness due to the stiffening structure 20 than the first outer layer 22 would have acting alone. The polymer fiber composite layer 30 spaces the first and second outer layers 22, 24 apart from one another to increase the bending stiffness of the structure 10. In this regard, the polymer fiber composite layer 30 acts as the core of the sandwich stiffening structure 20 and resists shear forces transmitted between the first outer layer 22 and the second outer layer 24 and thereby improves resistance of the first outer layer 22 to bending.

Notably, the first outer layer 22 and the second outer layer 24 each may have a higher stiffness than the stiffness of the polymer fiber composite layer 30. Furthermore, in an embodiment, the second outer layer 24 may have a thinner cross section than the polymer fiber composite layer 30. In this regard, the thickness and stiffness of the second outer layer 24 may be tuned or tailored to provide a desired failure mode of the polymer fiber composite layer 30 upon failure of the first outer layer 22. More specifically, in an embodiment, the structure 10 may be configured such that the second outer layer 24 fails in a manner allowing the polymer fiber composite layer 30 to deform at relatively high strains prior to fiber failure (i.e., fiber breakage) in order to maximize the amount of kinetic energy of the projectile that may be absorbed by the fiber as the projectile passes through the polymer fiber composite layer 30.

Referring to FIG. 2, shown is an illustration of a side view of the structure 10 of FIG. 1 and illustrating the arrangement of the first outer layer 22, the polymer fiber composite layer 30 and the second outer layer 24. As was indicated above, the first outer layer 22 preferably has a higher stiffness than the polymer fiber composite layer 30. The stiffness of the first outer layer 22 is preferably relatively high in order to increase dwell time of the projectile during the initial ballistic load. A high local harness of the first outer layer 22 may also increase dwell time of the initial impact during which a forwardmost portion of the projectile may be deformed while a remaining portion of the projectile continues moving and causing enlargement or mushrooming of the cross-sectional area of the projectile.

In this regard, local hardness of the first outer layer 22 may be increased by providing the polymer fiber composite layer 30 with a relatively high hardness matrix 54 (FIG. 4) in the cured state. By enhancing the local hardness of the first outer layer 22, deformation and/or enlargement of the cross-sectional area of the forwardmost portion of the projectile may be increased or enlarged. The enlargement of the projectile cross-sectional area may increase the amount of area of the first outer layer 22 that may be engaged in reacting the initial ballistic load of the projectile. Furthermore, an enlargement of the cross-sectional area of the projectile may facilitate the involvement of a larger portion of the polymer fiber composite layer 30 upon failure of the first outer layer 22. By involving more of the fibers 56 (FIG. 4) in the polymer fiber composite layer 30 during an impact event, the projectile may be more effectively decelerated.

Figure 9:
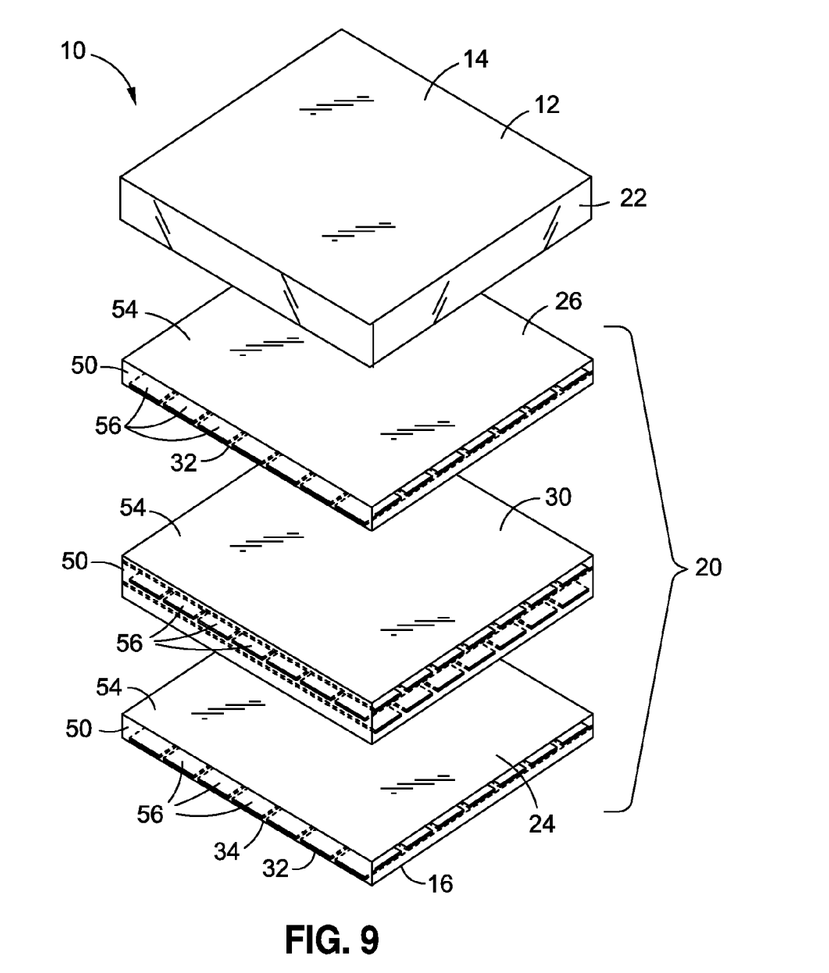
FIG. 9 is an exploded perspective illustration of the structure of FIG. 8 illustrating the polymer fiber composite layer sandwiched between the second outer layer and an intermediate layer forming the stiffening structure which is mounted to the first outer layer.

Referring still to FIG. 2, shown is the second outer layer 24 which is illustrated as a high stiffness composite layer 32 having fibers 56 (FIG. 9) embedded within a matrix 54 (FIG. 9) similar to the arrangement of the polymer fiber composite layer 30 (FIG. 9). However, as was indicated above, the high stiffness composite layer 32 embodiment of the second outer layer 24 preferably has a higher stiffness than the polymer fiber composite layer 30. Likewise, in the embodiment of FIG. 3, the glass layer 28 embodiment of the second outer layer 24 preferably has a higher stiffness than the polymer fiber composite layer 30. The glass layer 28 embodiment of the second outer layer 24 may comprise one or more sheets or layers of material which may at least partially comprise glass having a higher stiffness than the polymer fiber composite layer 30.

The second outer layer 24 cooperates with the first outer layer 22 and the polymer fiber composite layer 30 to provide an initially stiff response of the first outer layer 22 to a ballistic impact. Advantageously, sandwich configurations are typically stiffer per unit mass than monolithic materials such that the stiffening structure 20 collectively formed by the first and second outer layers 22, 24 and polymer fiber composite layer 30 results in a higher specific stiffness (i.e., stiffness of the structure 10 divided by the density of the structure 10) than would be achievable with a monolithic thickness of the second outer layer 24. A further advantage provided by the sandwich construction illustrated in FIG. 2 is that the specific density of the structure 10 is lower than the specific density of a structure 10 of monolithic construction. For example, certain conventional armor panels 12 are comprised of monolithic thicknesses of glasses or ceramics which are typically of relatively high density as compared to the polymer fiber 56 (FIG. 4) composite constructions. In contrast, the structure 10 disclosed herein provides improved ballistic performance with reduced weight.

Referring to FIG. 4, shown is an exploded perspective illustration of the embodiment of the structure 10 shown in FIGS. 1-3. As illustrated in FIG. 4, the first and second outer layers 22, 24 and the polymer fiber composite layer 30 collectively form the stiffening structure 20 which improves the global stiffness of the first outer layer 22. The polymer fiber composite layer 30 is illustrated as including a plurality of fibers 56 embedded within matrix 54 material. The second outer layer 24 is illustrated in generic form and may be comprised of a high stiffness composite layer 32 or as a glass monolithic layer or combination of layers 70 (FIG. 5) as indicated above. The high stiffness composite layer 32 embodiment of the second outer layer 24 may be configured as a composite layer assembly 50 including a plurality of fibers 56 embedded within a matrix 54. Likewise, the polymer fiber composite layer 30 may be configured as a composite layer assembly 50.

Figure 5:
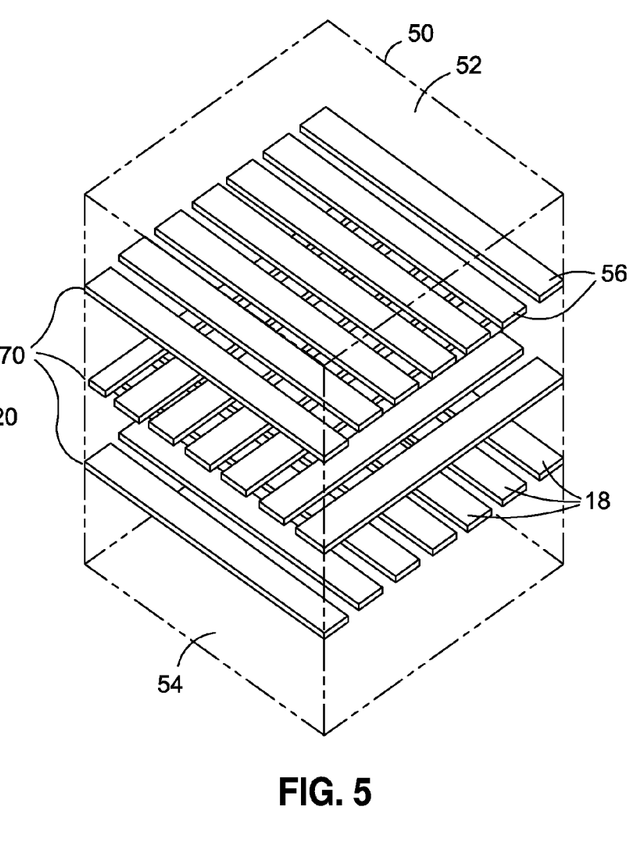
FIG. 5 is an exploded perspective illustration of the polymer fiber composite layer of the structure of FIG. 4 and illustrating layers of fibers arranged in a cross-ply configuration.

Referring to FIG. 5, shown is an exploded illustration of a composite layer assembly 50 illustrating a plurality of fibers 56 which may be formed as strips and arranged in one or more layers 70 within the matrix 54. The fibers 56 in each layer 70 are illustrated as being substantially parallel to each other although the fibers 56 may be oriented in any direction relative to one another within a given layer 70. Furthermore, FIG. 5 illustrates the fibers 56 as being oriented perpendicularly relative to the orientation of the fibers 56 in adjacent layers 70 such that the composite layer assembly 50 of FIG. 5 represents a cross-ply configuration of layers 70. However, the fibers 56 of a given layer 70 may be oriented at any angle relative to the fibers 56 of adjacent layers 70. For example, the fibers 56 of one layer 70 may be oriented parallel to the fibers 56 of adjacent layers 70 or at any non-perpendicular angle (e.g., 15°, 22.5, 45°, 60°, 75°, etc.) relative to the fibers 56 of adjacent layers 70.

Figure 6:
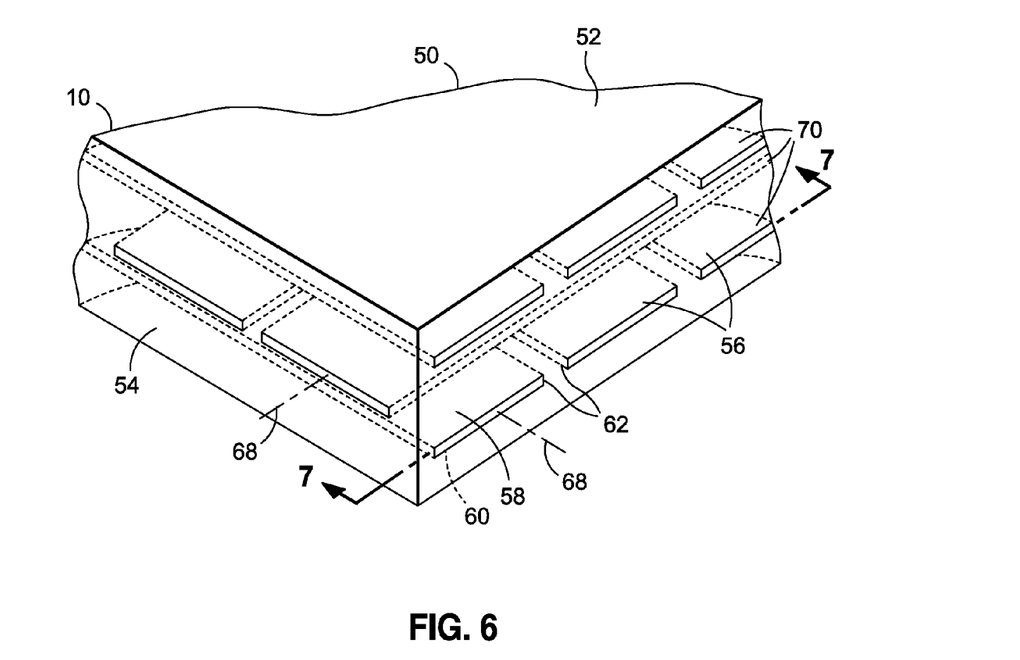
FIG. 6 is an enlarged perspective illustration of a portion of the polymer fiber composite layer of FIG. 4.

Referring to FIG. 6, shown is an enlarged perspective illustration of the composite layer assembly 50 of FIG. 4 and illustrating the relative orientations of the fibers 56 of the different layers 70. Although three layers 70 are illustrated in the composite layer assembly 50 of FIG. 6, any number of layers 70 may be provided. The fibers 56 may extend lengthwise in a given direction within the layer 70 along a fiber axis 68. The composite layer assembly 50 may include assembly surfaces 52 which may be placed in faying contact with the second outer layer 24 and the first outer layer 22 as illustrated in FIGS. 2 and 3.

Figure 7:
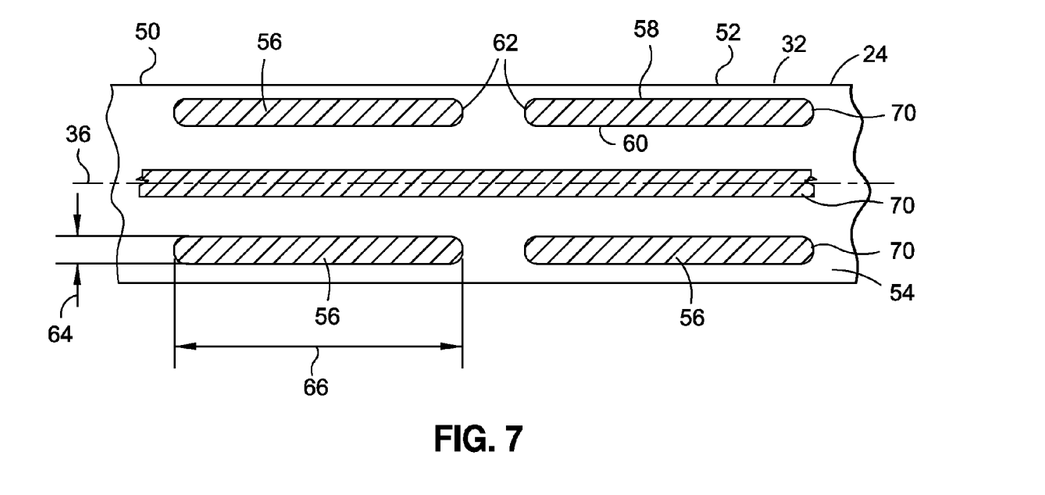
FIG. 7 is an enlarged sectional illustration of the polymer fiber composite layer taken along line 7 of FIG. 6 and illustrating the cross section of the fibers in an embodiment.

Referring to FIG. 7, shown is a cross-sectional illustration of an embodiment of the composite layer assembly 50 taken along line 7 of FIG. 6 and illustrating the arrangement of the fibers 56 in the layers 70. As was indicated above, the composite layer assembly 50 may represent an arrangement of the polymer fiber composite layer 30. In addition, the composite layer assembly 50 may represent the arrangement of the fibers 56 of the second outer layer 24 when the second outer layer 24 is configured in a high stiffness composite layer 32 configuration. The fibers 56 of the composite layer assembly 50 preferably have an elongated cross-sectional shape with relatively flattened or substantially planar fiber 56 faces to minimize bending or refracting of light that may otherwise occur when light passes through a curved surface.

Referring still to FIG. 7, the generally elongated cross-sectional shape of the fibers 56 preferably have a relatively high aspect ratio which may be defined as the ratio of fiber width 66 to fiber thickness 64. In an embodiment, the aspect ratio may vary from approximately 3 to approximately 500 although the fiber 56 cross section may have any aspect ratio of any value. In an embodiment, the fiber thickness 64 may be provided in the range of from approximately 5 microns to approximately 5,000 microns (0.0002 to 0.20 inch). However, the fiber 56 may be provided in any fiber thickness 64, without limitation. Furthermore, although the fibers 56 are illustrated as having a generally elongated cross-sectional shape, the fibers 56 may be provided in any one of a variety of alternative cross-sectional shapes. For example, the fibers 56 may be formed as a square, triangle or other cross-sectional shapes.

Referring to FIG. 7, the fibers 56 may include the substantially planar fiber 56 faces which may preferably be oriented substantially parallel to the assembly surfaces 52 of the composite layer assembly 50. However, the fibers 56 may be embedded within the matrix 54 such that the fiber 56 faces are arranged in any orientation including non-parallel orientations relative to the assembly surfaces 52. Although illustrated as being substantially planar, the fiber 56 faces of the fibers 56 may be slightly curved and may include slightly concave, slightly convex or crowned surfaces and are not necessarily limited to a strictly substantially planar or flat profile. Even further, the fiber 56 faces may include one or more surface features (not shown) such as on the upper and lower surfaces 58, 60 of the fibers 56. Although illustrated as being disposed in non-contacting relation to one another, the fibers 56 may be placed in contacting relation with one another such as along the side edges 62 of the fibers 56. The upper and lower surfaces 58, 60 of the fibers 56 may also be placed in contact with the upper and lower surfaces 58, 60 of the fibers 56 of adjacent layers 70.

The matrix 54 and the fibers 56 may be formed of any one of a variety of materials. For example, for the polymer fiber composite layer 30 (FIGS. 1-3), the matrix 54 (FIGS. 5-7) and the polymer fibers 56 (FIGS. 4 and 9) may be formed from at least one of the following thermoplastic materials: acrylics, fluorocarbons, polyamides, polyethylenes, polyesters, polypropylenes, polycarbonates, polyurethanes, polyetheretherketone, polyetherketoneketone, and polyetherimides. In addition, the matrix 54 and/or polymer fibers 56 may be formed of thermoset materials comprising at least one of the following: polyurethanes, phenolics, polyimides, bismaleimides, polyesters, epoxy, and silsesquioxanes. Even further, the fibers 56 and/or the matrix 54 may be formed of inorganic material including, but not limited to, carbons, silicon carbide, and boron. The fibers 56 and/or the matrix 54 may also be formed of glass comprising E-glass (alumino-borosilicate glass), S-glass (alumino silicate glass), pure silica, borosilicate glass and/or optical glass. For the high stiffness composite layer 32 embodiment of the second outer layer 24, the fibers 56 may comprise glass fibers 56. However, the fibers 56 of the high stiffness composite layer 32 may comprise high strength and/or high stiffness polymeric material such as ultra high density polyethylene such as SPECTRA™ or DYNEEMA™ brand high density polyethylenes. The high stiffness composite layer 32 may comprise relatively high strength and/or high stiffness fibers 56 in alternative compositions which provide a high stiffness to the second outer layer 24 relative to the stiffness of the polymer fiber composite layer 30.

Referring to FIGS. 8 and 9, shown is an embodiment of the structure 10 wherein the stiffening structure 20 comprises an intermediate layer 26 and a second outer layer 24 separated by the polymer fiber composite layer 30. The stiffening structure 20 is mounted to the first outer layer 22 and provides high global stiffness to the first outer layer 22. The intermediate layer 26 is mounted between the first outer layer 22 and the polymer fiber composite layer 30. The intermediate layer 26 preferably has a higher stiffness than the polymer fiber composite layer 30. Likewise, the second outer layer 24 preferably has a higher stiffness than the polymer fiber composite layer 30.

The intermediate layer 26 (FIGS. 8-9) may be configured similar to embodiments described above for the second outer layer 24 wherein the intermediate layer 26 may comprise a high stiffness composite layer 32 (FIGS. 8-9) or a glass layer 28 (FIG. 8) which may be of monolithic construction. Alternatively, the intermediate layer 26 may comprise a plurality of sheets of monolithic glass which individually or collectively may have a higher stiffness than the polymer fiber composite layer 30. Likewise, the first outer layer 22 and second outer layer 24 preferably have a higher stiffness than the polymer fiber composite layer 30 as indicated above.

Referring to FIG. 9, shown is a perspective exploded illustration of the structure 10 configuration of FIG. 8 and illustrating the second outer layer 24 and the intermediate layer 26 configured as a high stiffness composite layer 32. As described above, the high stiffness composite layer 32 may include a plurality of fibers 56 embedded within the matrix 54 similar to the construction of the polymer fiber composite layer 30 but wherein the high stiffness composite layer 32 is constructed to have a higher stiffness than the polymer fiber composite layer 30. As can also be seen in FIGS. 8 and 9, the intermediate layer 26 and the second outer layer 24 may have a reduced thickness relative to the thickness of the polymer fiber composite layer 30. Any one of the configurations of the structure 10 may include a spall layer 34 mounted to the exposed face of the second outer layer 24. The spall layer 34 may be provided in a relatively thin cross section and may be configured to capture fragments of the projectile or structure 10 during a ballistic event.

Although FIGS. 8 and 9 illustrate the structure 10 in an embodiment having a single intermediate layer 26 and polymer fiber composite layer 30, the structure 10 may comprise multiple alternating intermediate layers 26 and polymer fiber composite layers 30. In this regard, the structure 10 may comprise a series of layers 70 (FIG. 6) starting with the first outer layer 22 and having a repeating series of alternating intermediate layers 26 and polymer fiber composite layers 30 in any quantity and wherein the repeating series of alternating intermediate layers 26 and polymer fiber composite layers 30 optionally terminates with a second outer layer 24 at the back face 16 of the structure 10.

Furthermore, any one of the intermediate layers 26 (FIG. 9) in the alternating series may comprise a plurality of the intermediate layers 26 placed in back-to-back arrangement with one another and wherein each one of the intermediate layers 26 possesses different mechanical properties such as differing stiffnesses relative to the mechanical properties of other intermediate layers 26. Likewise, any one of the alternating polymer fiber composite layers 30 may comprise a plurality of the polymer fiber composite layers 30 which may have different properties relative to the mechanical properties of other polymer fiber composite layers 30. In this regard, for structures 10 comprised of alternating intermediate layers 26 and polymer fiber composite layers 30, the properties of each intermediate layer 26 may be varied to provide a desired failure mode of the structure 10. For example, properties including, but not limited to, stiffness, strength and failure strain may be varied among the intermediate layers 26 to achieve a desired failure mode of the structure 10. In this regard, it should be noted that in the context of the present disclosure, properties such as strength and strain are in terms of dynamic properties and/or quasi-static properties. Properties may also be varied among the polymer fiber composite layers 30 to achieve a desired failure mode of the structure 10. As indicated above, one or more of the intermediate layers 26 among the alternating series of intermediate layers 26 and polymer fiber composite layers 30 may be comprised of monolithic glass and/or a high stiffness composite layer 32.

In a non-limiting embodiment, the structure 10 may be configured such that the structure 10 has a relatively high stiffness adjacent to the strike face 14 (FIG. 9) relative to the stiffness of the structure 10 adjacent to the back face 16 (FIG. 9). Furthermore, the structure 10 may be configured such that the stiffness reduces gradually along a direction from the strike face 14 to the back face 16. In an embodiment of the structure 10 wherein the stiffening structure 20 (FIG. 9) comprises a series of alternating intermediate layers 26 and polymer fiber composite layers 30 terminating at a second outer layer 24 at the back face 16, the stiffness of the intermediate layers 26 located adjacent to the strike face 14 may be greater than the stiffness of the intermediate layers 26 located adjacent to the back face 16. In an embodiment, the polymer fiber composite layer 30 located adjacent the strike face 14 may include fibers 56 comprised of ultra high density polyethylene such as SPECTRA™ or DYNEEMA™ brand high density polyethylenes to provide a high degree of stiffness to the polymer fiber composite layer 30. In contrast, the polymer fiber composite layer 30 located adjacent the back face 16 may include fibers 56 comprised of Nylon or other fiber material having a lower strength and/or stiffness than the fibers 56 of the polymer fiber composite layer 30 located adjacent the strike face 14. In this regard, the intermediate layers 26 and polymer fiber composite layers 30 may include any combination of fiber 56 material and matrix 54 material to provide the desired degree of stiffness as a function of the location of the intermediate layers 26 and polymer fiber composite layers 30 of the structure 10.

Figure 10:
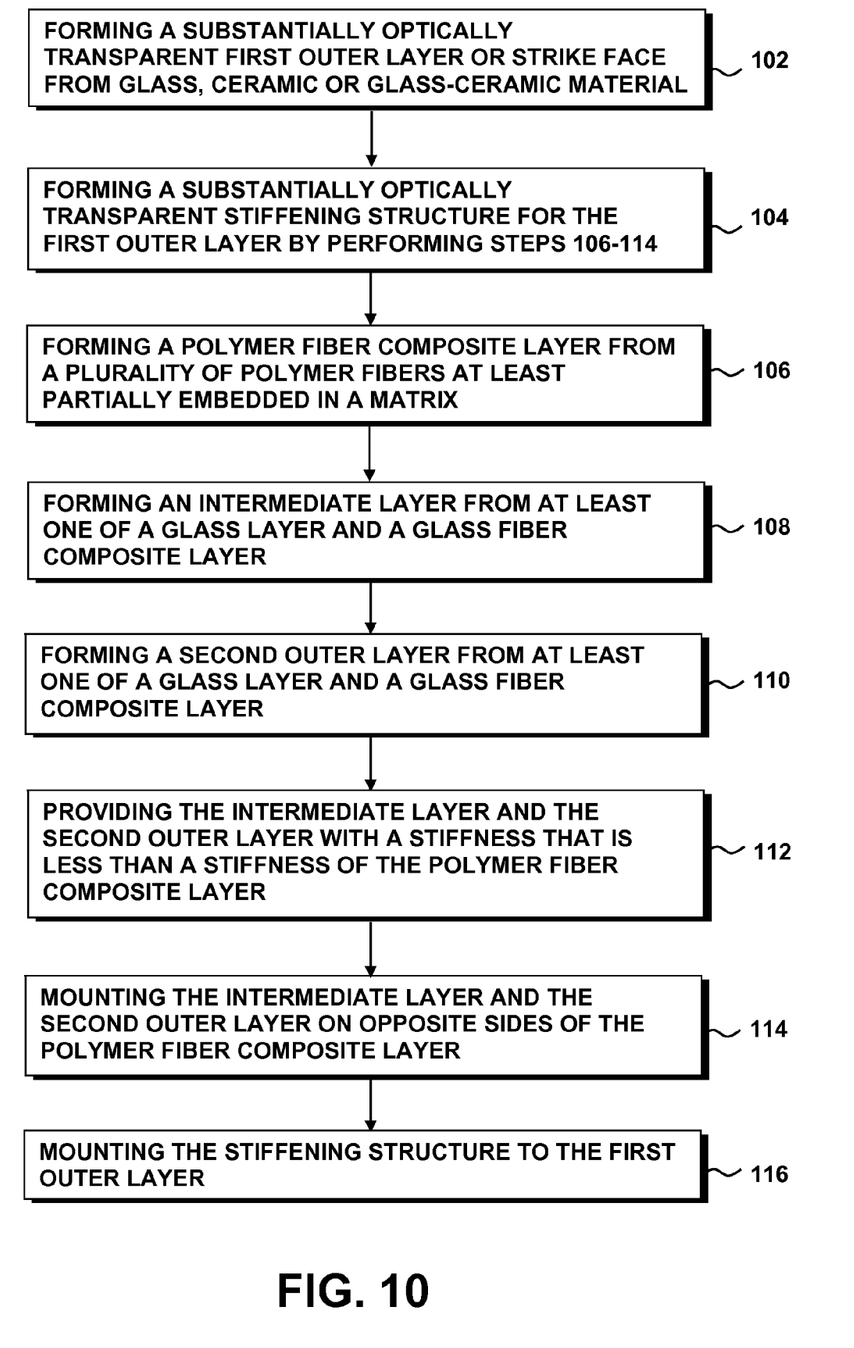
FIG. 10 is a flow chart illustrating one or more operations that may be included in an embodiment of a methodology for manufacturing the structure.

Referring to FIG. 10, shown is a flow chart illustrating one or more operations that may be included in a methodology of manufacturing a structure 10 similar to that which is illustrated in FIGS. 1-9. Step 102 of FIG. 10 may include forming a substantially optically transparent first outer layer 22 or strike face 14. As was indicated above, the first outer layer 22 is preferably formed at least partially of a glass material, ceramic material or glass-ceramic material, each preferably having a relatively high hardness. In an embodiment, the first outer layer 22 may comprise glass such as monolithic glass. However, the first outer layer 22 may comprise other materials which are preferably substantially optically transparent and which preferably have relatively high hardness and relatively high stiffness.

Step 104 of the methodology of FIG. 10 may include forming the stiffening structure 20 (FIG. 2) for mounting to the first outer layer 22 in order to improve the ballistic performance of the structure 10 by providing a stiff initial response of the first outer layer 22 to a ballistic event. The stiffening structure 20 may be configured to be substantially optically transparent. However, the present disclosure contemplates fabrication of the stiffening structure 20 with opaque materials or a combination of opaque and transparent materials. Even further, the present disclosure contemplates fabrication of the stiffening structure 20 with materials having any level of transparency ranging from substantially transparent to substantially opaque.

Step 106 of the methodology of FIG. 10 may comprise forming a polymer fiber composite layer 30 from a plurality of polymer fibers 56 embedded within the matrix 54 similar to that which is illustrated in FIGS. 4-7 and described above. Likewise, step 108 may comprise forming the intermediate layer 26 as a high stiffness composite layer 32 in manner similar to that which is illustrated in FIGS. 4-7 and described above. Alternatively, the intermediate layer 26 may be formed at least partially of monolithic glass wherein the intermediate layer 26 may include one or more sheets or layers 70 (FIGS. 6-7) of monolithic glass which preferably have a higher stiffness than the polymer fiber composite layer 30.

Step 110 of the methodology of FIG. 10 may comprise forming the second outer layer 24 from a high stiffness composite layer 32 (FIGS. 8-9) or as one or more glass layers 28 comprised of one or more sheets of monolithic glass. When fabricating the second outer layer 24 and intermediate layer 26 as a high stiffness composite layer 32, the fibers 56 may be selected to provide a relatively high level of stiffness as compared to the stiffness of the polymer fiber composite layer 30.

Step 112 of the methodology of FIG. 10 may comprise forming the polymer fiber composite layer 30 as a composite layer assembly 50 similar to that which is illustrated in FIG. 5 and described above. The polymer fiber composite layer 30 (FIGS. 2-3) may include polymer fibers 56 (FIG. 4) embedded in a matrix 54 (FIG. 4). The fibers 56 and the matrix 54 are preferably substantially optically transparent. The matrix 54 of the polymer fiber composite layer 30 may be selected to provide a relatively high level of hardness for improving the local hardness of the first outer layer 22. As was indicated above, a relatively high local hardness may provide improved resistance of the first outer layer 22 to the initial ballistic load and may increase deformation and enlargement (e.g., mushrooming) of the projectile during the initial impact.

Step 114 of the methodology of FIG. 10 may comprise forming the stiffening structure 20 (FIG. 9) by mounting the intermediate layer 26 and the second outer layer 24 to opposed sides of the polymer fiber composite layer 30. The intermediate layer 26 and second outer layer 24 may be bonded to the polymer fiber composite layer 30 using a suitable adhesive. The adhesive is preferably substantially optically transparent. Alternatively, the stiffening structure 20 may be formed by co-curing the intermediate layer 26 and the second outer layer 24 with the polymer fiber composite layer 30.

Step 116 of the methodology of FIG. 10 may include mounting the stiffening structure 20 (FIG. 9) to the first outer layer 22 by bonding or otherwise attaching the intermediate layer 26 of the stiffening structure 20 to the first outer layer 22. A spall layer 34 may optionally be included on the exposed face of the second outer layer 24 as indicated above to provide a mechanism for retaining fragments otherwise ejected from the structure 10 during a ballistic event.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A structure, comprising
a first outer layer formed as a monolithic non-fibrous sheet of glass, ceramic, or glass-ceramic material;
a polymer fiber composite layer located directly adjacent to and bonded to one side of the first outer layer and including polymer fibers at least partially embedded in a matrix;
a second outer layer mounted directly adjacent to the polymer fiber composite layer on a side opposite the first outer layer, the second outer layer comprising a composite layer formed of glass fibers and/or polymer fibers having a higher stiffness than the polymer fibers in the polymer fiber composite layer, the second outer layer having a thinner cross section than the polymer fiber composite layer and configured to fail in a manner allowing the polymer fiber composite layer to deform at relatively high strains prior to fiber failure;
the first outer layer and the second outer layer each having a higher stiffness than the polymer fiber composite layer;
the polymer fiber composite layer acting as a spacer spacing apart the first and second outer layer and forming a sandwich stiffening structure increasing a global stiffness of the first outer layer relative to the stiffness of the first outer layer acting alone; and
the first outer layer and the polymer fiber composite layer are each substantially optically transparent.

2. The structure of claim 1 wherein:
at least one of the matrix and the polymer fibers are formed of at least one of the following materials:
a thermoplastic material comprising at least one of the following: acrylics, fluorocarbons, polyamides, polyethylenes, polyesters, polypropylenes, polycarbonates, polyurethanes, polyetheretherketone, polyetherketoneketone, polyetherimides; and
a thermoset comprising at least one of the following: polyurethanes, phenolics, polyimides, bismaleimides, polyesters, epoxy, silsesquioxanes.

3. The structure of claim 2 wherein:
the polymer fibers have a cross section with an aspect ratio of fiber width to fiber thickness; and
the aspect ratio being in the range of from approximately 3 to approximately 500.

4. The structure of claim 1 further comprising:
a spall layer mounted to the second outer layer.

5. The structure of claim 1 wherein the structure is configured as at least one of the following:
a windshield, a canopy, a window, a membrane, an armor panel, a structural panel, an architectural panel, a non-structural article.

6. The structure of claim 1 wherein the composite layer includes high density polyethylene fibers.

7. The structure of claim 1 wherein:
at least one of the polymer fiber composite layer and the second layer is configured as a composite layer assembly having at least one layer of fibers oriented parallel to each other.

8. The structure of claim 7 wherein:
the composite layer assembly has at least two layers of fibers;
the fibers in each of the at least two layers are parallel to each other; and
the fibers in one layer of the at least two layers are non-parallel to the fibers in the other one of the at least two layers.

9. The structure of claim 7 wherein:
the fibers in at least one of the layers have substantially planar fiber faces oriented substantially parallel to an assembly surface of the composite layer assembly.

10. The structure of claim 7 wherein:
the fibers in at least one of the layers have side edges that are in contacting relation with one another.

11. The structure of claim 7 wherein:
the fibers in at least one of the layers has a fiber thickness in the range of approximately 5-5,000 microns.

12. A transparent armor panel, comprising
a first outer layer formed as a monolithic non-fibrous sheet comprised of at least one of ceramic material and glass material;
a polymer fiber composite layer located directly adjacent to and bonded to one side of the first outer layer and comprising a plurality of polymer fibers at least partially embedded in a matrix;
a second outer layer mounted directly adjacent to the polymer fiber composite layer on a side thereof opposite the first outer layer, the second outer layer comprising a composite layer formed of glass fibers and/or polymer fibers having a higher stiffness than the polymer fibers in the polymer fiber composite layer;
the second outer layer having a thickness that is less than a thickness of the polymer fiber composite layer;
the first outer layer and the second outer layer each having a higher stiffness than the polymer fiber composite layer;
the polymer fiber composite layer acting as a spacer spacing apart the first and second outer layer and forming a sandwich stiffening structure increasing a global stiffness of the first outer layer relative to the stiffness of the first outer layer acting alone; and
the first outer layer, the polymer fiber composite layer and the second outer layer being substantially optically transparent.

13. A method of manufacturing a structure, comprising the steps of:
forming a first outer layer as a monolithic non-fibrous sheet of at least one of ceramic material and glass material;
forming a polymer fiber composite layer of a plurality of polymer fibers at least partially embedded within a matrix;
providing the polymer fiber composite layer with a stiffness that is less than the stiffness of the first outer layer;
mounting the polymer fiber composite layer directly adjacent to one side of the first outer layer;
forming a second outer layer as a composite layer formed of glass fibers and/or polymer fibers embedded in a matrix and having a higher stiffness than the polymer fibers in the polymer fiber composite layer, the second outer layer having a thinner cross section than the polymer fiber composite layer, the first outer layer and the second outer layer each having a higher stiffness than the polymer fiber composite layer; and mounting the second outer layer directly adjacent to the polymer fiber composite layer on a side opposite the first outer layer.

14. The method of claim 13 further comprising the step of: mounting a spall layer to the second outer layer.

15. The method of claim 13 wherein:
the first outer layer, the second outer layer, and the polymer fiber composite layer are each substantially optically transparent.

16. The method of claim 13 wherein:
the polymer fibers have a cross section with an aspect ratio of fiber width to fiber thickness in the range of from approximately 3-500.

17. The method of claim 13 wherein:
wherein the polymer fiber composite layer includes high density polyethylene fibers.

18. The method of claim 13 wherein:
at least one of the matrix and the polymer fibers are formed of at least one of the following materials:
　a thermoplastic material comprising at least one of the following: acrylics, fluorocarbons, polyamides, polyethylenes, polyesters, polypropylenes, polycarbonates, polyurethanes, polyetheretherketone, polyetherketoneketone, polyetherimides; and
　a thermoset comprising at least one of the following: polyurethanes, phenolics, polyimides, bismaleimides, polyesters, epoxy, silsesquioxanes.

19. The method of claim 13 wherein the step of mounting the polymer fiber composite layer directly adjacent to one side of to the first outer layer, and the step of mounting the second outer layer directly adjacent to the polymer fiber composite layer on a side opposite the first outer layer are performed by adhesive bonding.

20. A method of manufacturing a transparent armor panel, comprising the steps of:
　forming a first outer layer from substantially optically transparent material comprised of at least one of ceramic material and glass material; and
　forming a substantially optically transparent polymer fiber composite layer from a plurality of polymer fibers at least partially embedded in a matrix, the polymer fiber composite layer being substantially optically transparent;
　mounting the polymer fiber composite layer directly adjacent to one side of the first outer layer;
　forming a substantially optically transparent second outer layer as a composite layer formed of glass fibers and/or polymer fibers having a higher stiffness than the polymer fibers in the polymer fiber composite layer;
　providing the first outer layer and the second outer layer with a stiffness that is higher than a stiffness of the polymer fiber composite layer; and
　mounting the second outer layer directly adjacent to the polymer fiber composite layer on a side thereof opposite the first outer layer; and
　mounting a spall layer to the second outer layer.

* * * * *